US007012194B1

(12) United States Patent
Wang

(10) Patent No.: US 7,012,194 B1
(45) Date of Patent: Mar. 14, 2006

(54) CABLE ADAPTER

(75) Inventor: Wan-I Wang, Taipei (TW)

(73) Assignee: Amy Wang, Taipei (TW)

( * ) Notice: Subject to any disclaimer, the term of this patent is extended or adjusted under 35 U.S.C. 154(b) by 0 days.

(21) Appl. No.: 11/024,697

(22) Filed: Dec. 30, 2004

(51) Int. Cl.
*H02G 3/06* (2006.01)

(52) U.S. Cl. ..................................... 174/92; 174/138 F

(58) Field of Classification Search .................. 174/92, 174/138 F, 84 C, 88 R; 439/791, 794, 413, 439/425
See application file for complete search history.

(56) References Cited

U.S. PATENT DOCUMENTS 3,049,582 A * 8/1962 Shinn .......................... 174/92
3,519,731 A * 7/1970 Grunbaum .............. 174/138 F
3,576,937 A * 5/1971 Eldridge, Jr. ................ 174/92
3,715,705 A * 2/1973 Kuo ........................... 439/422
6,333,464 B1 * 12/2001 Ellison ........................ 174/92

* cited by examiner

*Primary Examiner*—Chau N. Nguyen
(74) *Attorney, Agent, or Firm*—Leong C. Lei

(57) ABSTRACT

A cable adapter related to a box is comprised of two plastic injection molded halves abutted to each other containing multiple locking ribs, clamping channels and conductors; cables to be connected being inserted from opposite sides of the box; terminals of the cables being locked to the conductors to permit easy, safe, and quick connection without the necessity to tie up the terminals or wrap up with insulating vanish cloth while giving the attractive appearance of the cable connection.

1 Claim, 8 Drawing Sheets

CABLE ADAPTER

BACKGROUND OF THE INVENTION (a) Technical Field of the Invention

The present invention is related to a cable adapter, and more particularly, to a box that allows cable connection simply by inserting the cable end into the box.

(b) Description of the Prior Art

Extension cables are usually required in wiring layout. In conventional connection, particularly in the connection of cables for the ordinary interior wiring among socket, switch holder, lighting fixtures, and/or special monitor devices, extension and branching connection are done as illustrated in FIG. 8. Wherein, one end each of two sections of an electric wire 20 to be connected to each other is stripped of its enamel insulated cover to expose a metal terminal 21 in a proper length. Both terminals 21 are then twisted together either by hand or by a pair of pliers to form a tie (22). The tie (22) is then securely wrapped up with an insulating varnish cloth (23) to have the entire tie (22) protruding and resting on the side of the electric wire (20) and then the tie (22) and the electric wire (20) are jointly wrapped up with the insulating varnish cloth (23). The warp formed by the tie (22) is detrimental to the appearance of the electric wire (20). Furthermore, in terms of safety, accumulated heat and abnormally increased resistance easily occur at the tie (22) as current flows through resulting in broken wire and leakage in case of insufficient wrap or twisting of the terminals (21). The absence of any damp-proof design could cause electric shock when the tie is soaked in water. The status of the connection is entirely determined by the operation skill and the work quality of the electrician. The fact is that the electrician usually works exactly according to personal experience. Accordingly, doubts in safety always exist in the connection of electric wire of the prior art. How to standardize the connection of electric wire, make the connection work easier, and provide significant improvement of the consistent safety of the work quality, a modulus accessory for the connection is definitely required.

SUMMARY OF THE INVENTION

The primary purpose of the present invention is to provide a cable adapter that meets the purpose of easier and safer connection quality with attractive appearance. To achieve the purpose, a box comprised of two pre-fabric halves abutted to each other with built-in locking ribs and clamping channels are provided; and the exposed metal ends of both sections of a cable are simply inserted into the box from opposite sides and snapped to each other.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

Figure 1:
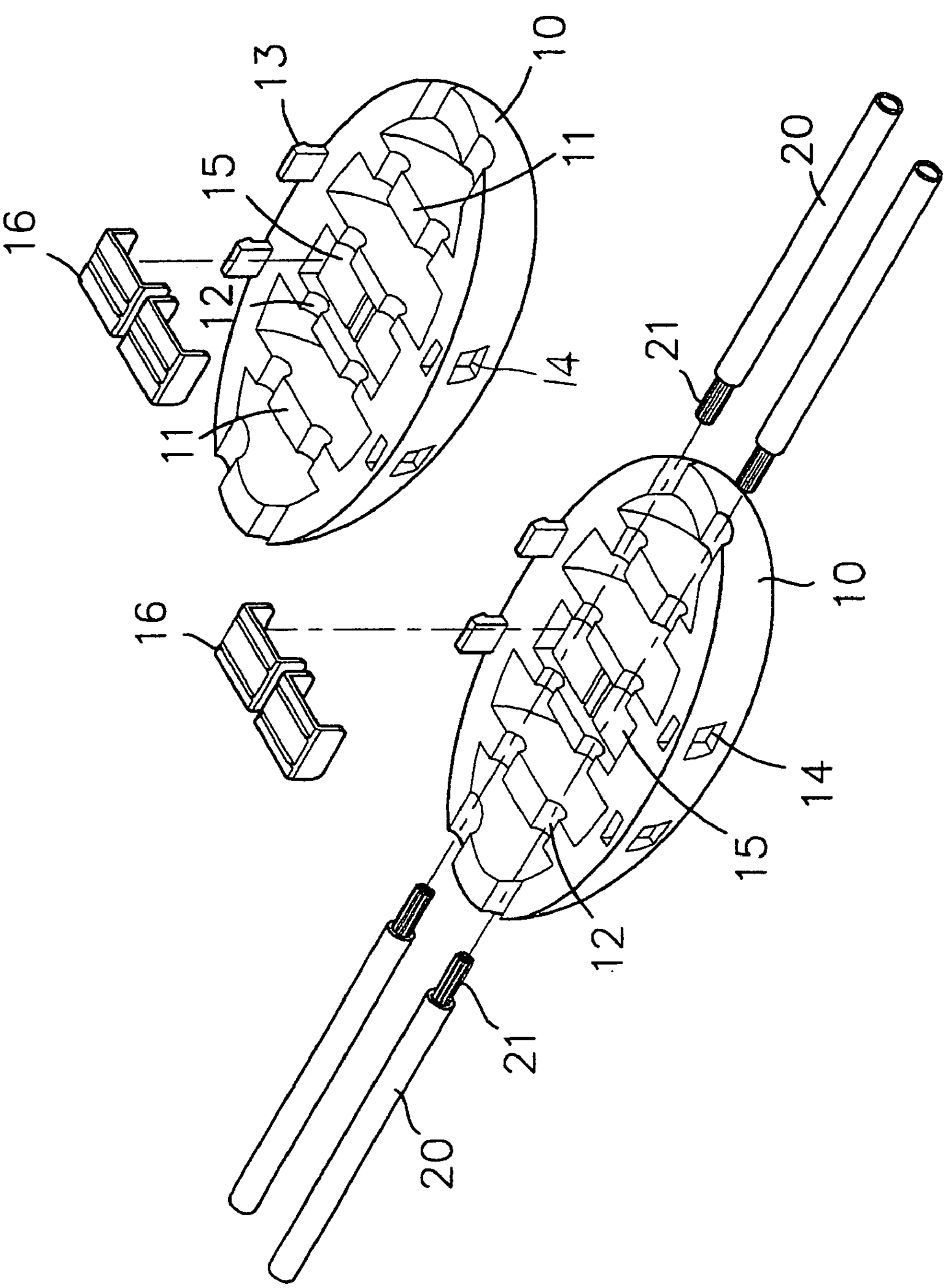
FIG. 1 is an exploded view of a preferred embodiment of the present invention.
Figure 2:
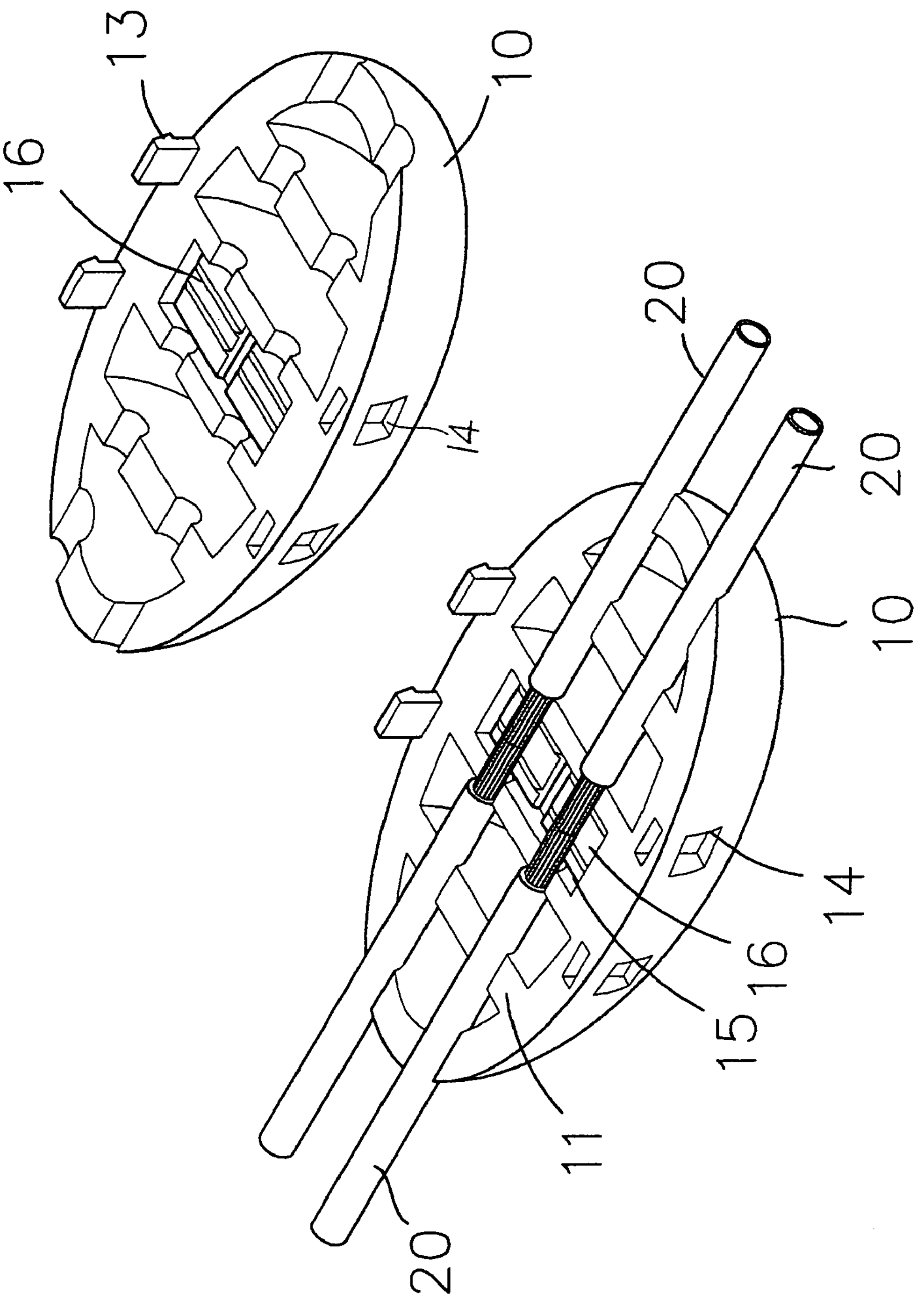
FIG. 2 is a schematic view showing the preferred embodiment of the present invention in use.
Figure 3:
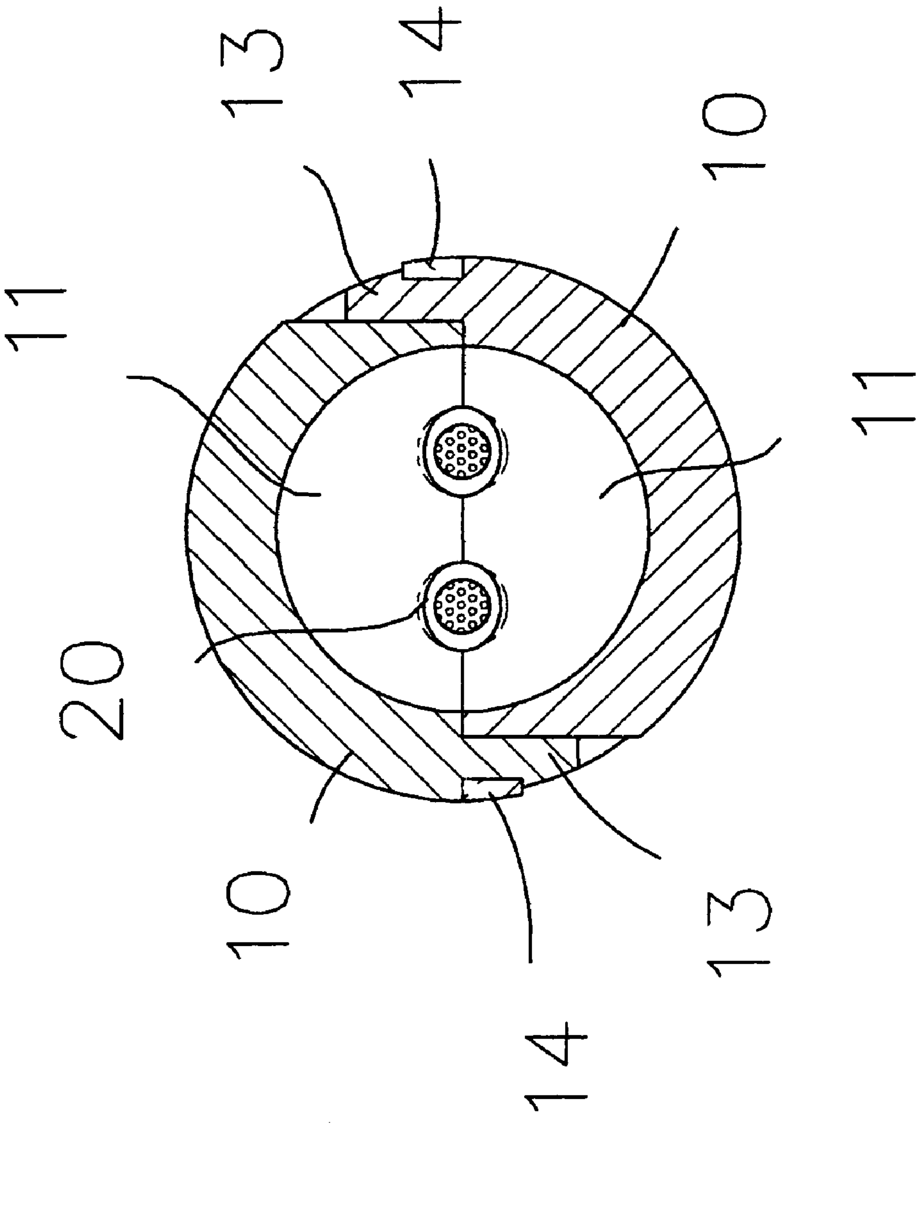
FIG. 3 is a sectional view of a snap means of the preferred embodiment of the present invention.
Figure 4:
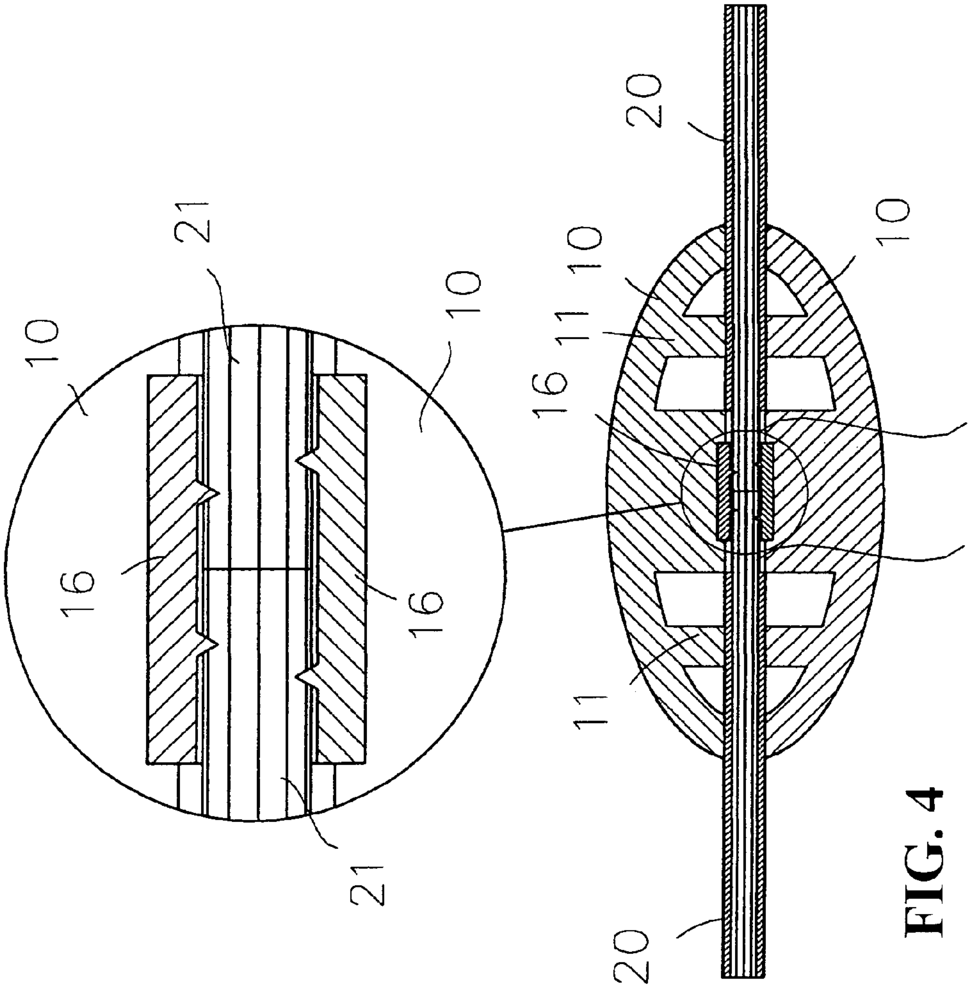
FIG. 4 is a schematic view showing connection of two cables in the preferred embodiment of the present invention.
Figure 5:
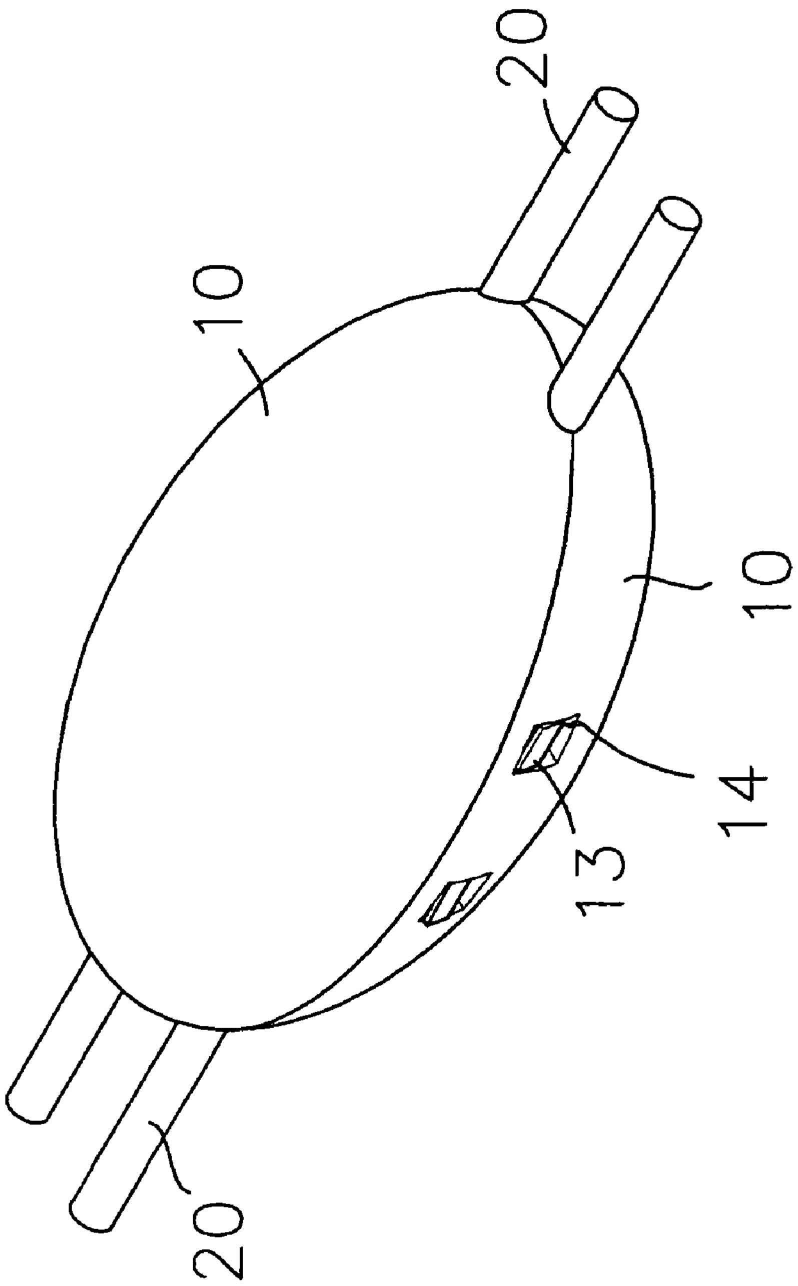
FIG. 5 is a schematic view showing the appearance of the preferred embodiment of the present invention in use.

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Referring to FIGS. 1 through 5, the present invention is related to a cable adapter in the form of a box (10) comprised of two prefabricated halves abutted to each other. The appearance of the box may have any design as the creativity goes as long as it is attractive and waterproof. Each half is provided on its inner side multiple locking ribs (11) for constructional reinforcement and clamping an electric wire (20). Multiple clamping channels (12) are provided in recess on both sides of each locking rib (11) to accommodate the electric wire (20). On the outer circumference of each half of the box (10) is disposed of multiple locking tabs (13) on one side and equal number of slots (14) on the other side for both halves to be locked to each other. A shallow trough (15) is provided in the center of each half of the box (10) to receive insertion in position of a metal conductor (16). The number of the trough (15) is equal to the quantity of the electric wire (20) to be connected. Accordingly, each metal terminal (21) of two sections of the electric wires (20) are inserted into and secured by the conductor (16), and thus are connected to each other and conducted.

Figure 6:
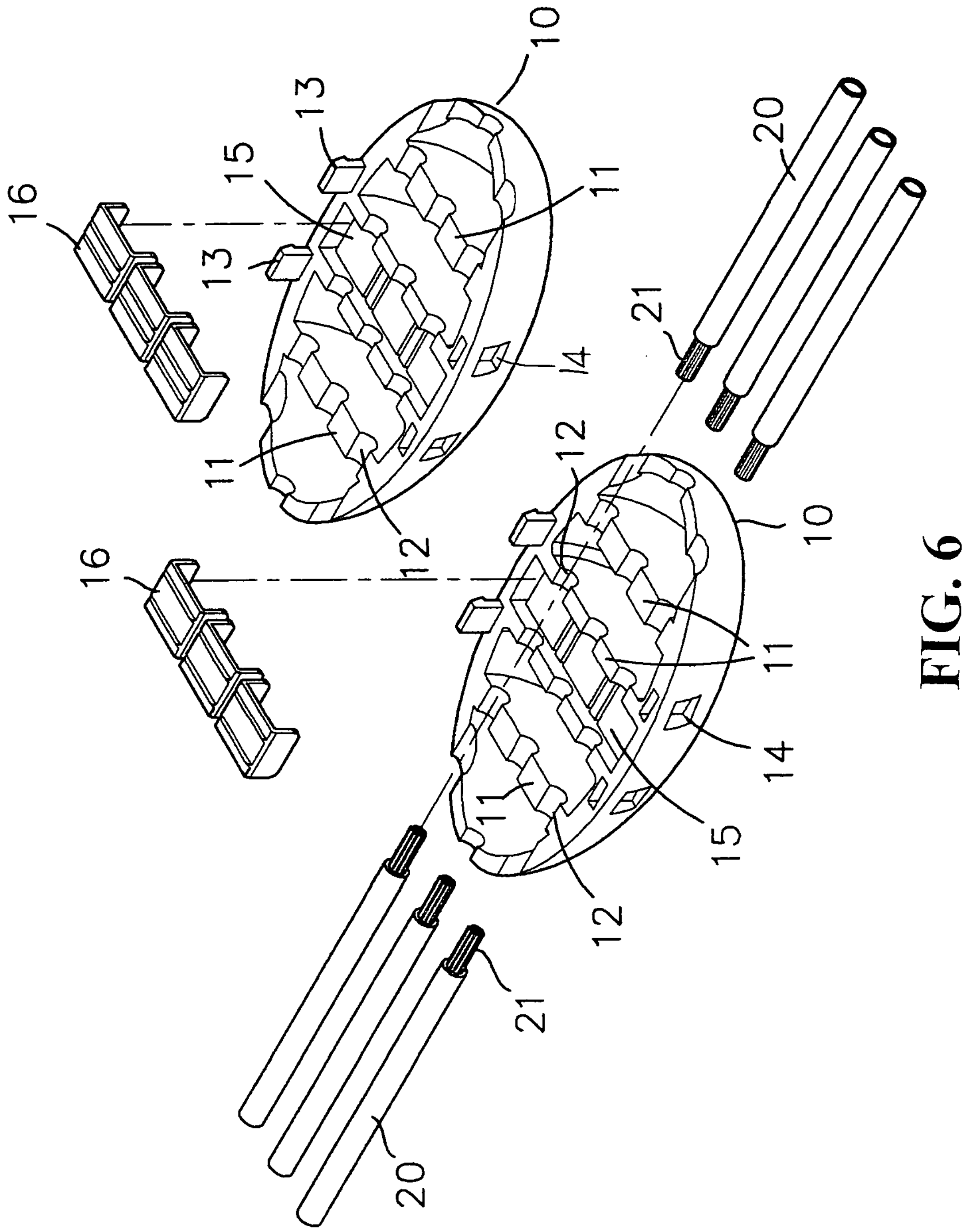
FIG. 6 is an exploded view showing connection of three cables by another preferred embodiment of the present invention.
Figure 7:
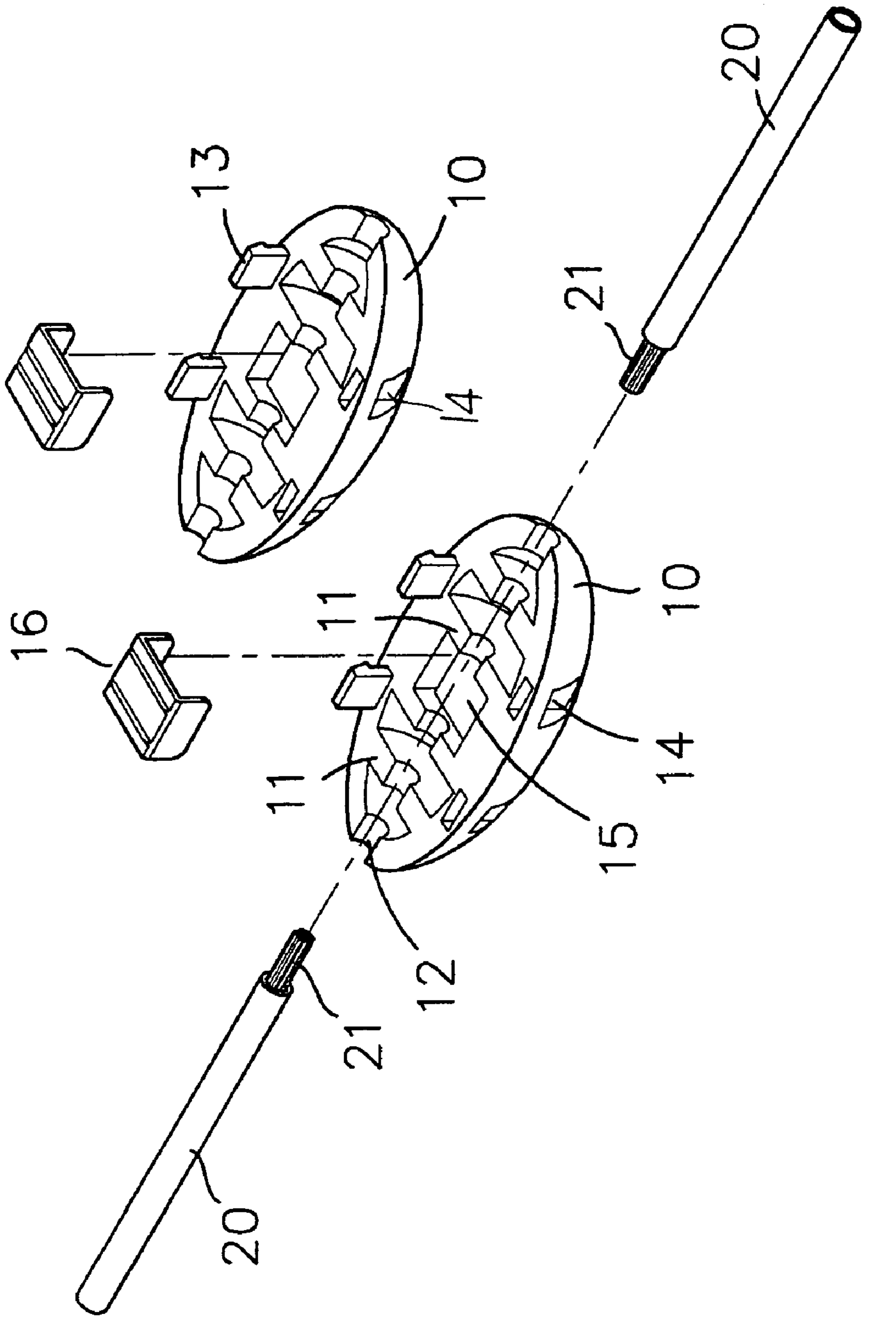
FIG. 7 is an exploded view showing connection of single cable by another preferred embodiment yet of the present invention.
Figure 8:
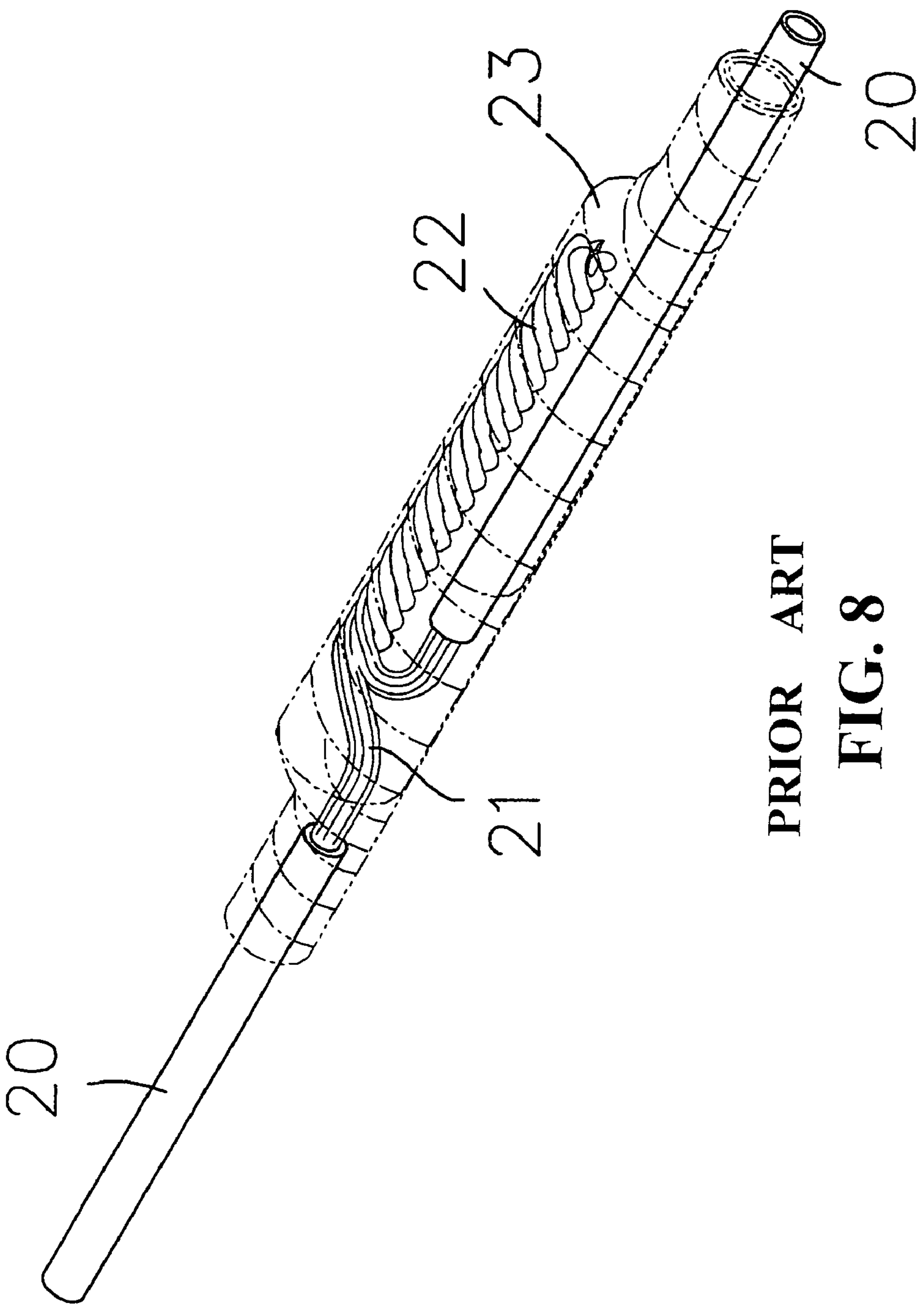
PRIOR ART FIG. 8
FIG. 8 is a schematic view showing connection of the prior art.

The present invention by providing the box (10) comprised of two halves abutted to each other. Two metal terminals (21) respectively from two sections of electric wires (20) to be connected to each other are inserted into the box (10) from opposite sides of the box (10) and meet at where the metal conductor (16) is provided. Both electric wires (20) are therefore conducted to achieve easy and safe connection. Both electric wires (20) are secured in position by the clamping channels (12) and locking ribs (11) from top and at bottom to rule out the possibility of falling off. The inner surface of the conductor (16) that contacts the metal terminals (21) may be roughened to further secure the connection of the electric wires (20). Both halves of the box (10) may be flanged, and the flange may be graded or respectively provided with a wall and a slot (not illustrated) for insertion of a waterproof sealing strip or plate to assure complete enclosure of the box (10) to fend of water permeation, thus electricity leakage. Both halves of the box (10) may be directly fastened to each other with screwed holes and bolts. The locking tabs (13) and the slots (14) for both halves of the box (10) to be snapped into each other allows each half to be made in a module for easy assembly and cost reduction. Depending on the quantity of the electric wire (20) to be connected, the present invention can be produced for the connection of a single electric wire or multiple electric wires (20) at the same time as illustrated in FIGS. 6 and 7. The box design for the cable adapter of the present invention permits fast and safe connection while maintaining the integral and attractive appearance of the connection to actually achieve the safe, convenient, practical and artistic purposes.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A cable adapter comprising: a box composed of two halves abutted to each other, each of said halves having an inner side provided with a plurality of locking ribs each having two clamping channels, each of said halves having an outer circumference provided with a plurality of locking tabs at one side of said outer circumference and a plurality of slots at an opposite side of said outer circumference, said locking tabs being configured to engage with said slots, a trough provided at a center of each of said halves, a metal conductor fitted in said troughs and having a top provided with a plurality of raised lines, a plurality of electric wires each having an end stripped to expose a metal terminal, said electric wires being inserted into said box from opposite sides of said box, said metal terminal of each of said electric wires meeting a corresponding metal terminal of another one of said electric wires in said troughs to be conducted and secured in position by said raised lines of said metal conductor.

* * * * *